(12) United States Patent
Boss et al.

(10) Patent No.: US 7,825,890 B2
(45) Date of Patent: Nov. 2, 2010

(54) APPARATUS, SYSTEM AND METHOD OF PROVIDING AUTO-DIMMING AND STATE TRANSITION SIGNAL FUNCTIONALITY TO TELEPHONE SYSTEMS

(75) Inventors: Gregory Jensen Boss, American Fork, UT (US); Rick Allen Hamilton, II, Charlottesville, VA (US); Alexandre Polozoff, Bloomington, IL (US); Timothy Moffett Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 1081 days.

(21) Appl. No.: 11/335,442

(22) Filed: Jan. 19, 2006

(65) Prior Publication Data
US 2007/0167186 A1    Jul. 19, 2007

(51) Int. Cl.
G09G 3/36 (2006.01)
F21V 33/00 (2006.01)
F21V 23/00 (2006.01)
(52) U.S. Cl. .................. 345/102; 362/85; 362/109; 362/295
(58) Field of Classification Search .......... 362/85, 362/109, 295, 559, 600, 802; 345/102
See application file for complete search history.

(56) References Cited

U.S. PATENT DOCUMENTS

| 5,210,467 A | 5/1993 | Nagashima |
| 6,112,140 A | 8/2000 | Hays et al. |
| 7,144,136 B2 * | 12/2006 | Drader et al. ............ 362/295 |
| 2001/0013854 A1 * | 8/2001 | Ogoro ...................... 345/102 |

OTHER PUBLICATIONS

Marine Monitors provide ambient light dimming using photoreceptive/photodiode cell for control.

* cited by examiner

*Primary Examiner*—Curtis Kuntz
*Assistant Examiner*—Mohammad K Islam
(74) *Attorney, Agent, or Firm*—Schmeiser, Olsen & Watts; William H. Steinberg

(57) ABSTRACT

An apparatus, system and method of providing auto-dimming and state transition signal functionality to a telephone system are provided. Generally, when the telephone system is in use, it will have an illuminated screen that may distract others. Because of this, when the telephone system is entering a state that does not require monitoring by the user, the illuminated screen may dim down to decrease the likelihood of distraction by others. However, since the user may want to know when the telephone system is no longer in that state, the telephone system may alert the user when it has transitioned out of that state.

18 Claims, 5 Drawing Sheets

| 302 ACTION | 304 ACTIVE | 306 INDICATION |
|---|---|---|
| 310 WEB PAGE LOADING | YES | 320 LED |
| 312 TEXT SEARCH | YES | 322 VIBRATION + LED |
| 314 SYSTEM RESET | YES | 324 SCREEN ILLUMINATION INTENSITY INCREASE |
| 316 DOCUMENT LOADING | NO | |
| 318 NON-DEFINED HOURGLASS EVENTS | NO | |
| | | |

FIG. 3

APPARATUS, SYSTEM AND METHOD OF PROVIDING AUTO-DIMMING AND STATE TRANSITION SIGNAL FUNCTIONALITY TO TELEPHONE SYSTEMS

BACKGROUND OF THE INVENTION

1. Technical Field

The present invention is directed generally to telephone systems. More specifically, the present invention is directed to an apparatus, method and system of providing auto-dimming and state transition signal functionality to telephone systems. Note that the term "telephone systems" is used to include cellular telephones, personal digital assistants (PDAs) or any hand-held device with a screen that runs on battery and/or that may be used in a public environment.

2. Description of Related Art

In recent years, many new features have been added to telephone systems. These features include PDA functionality (for non-PDA devices), Web browsing functionality, document downloading and reviewing, e-mail services etc. With these added functionalities comes reduced battery life. For instance, to facilitate the use of these functions, screens of these telephone systems have been getting larger and larger. Consequently, more power is needed to illuminate the screens of these telephone systems contributing to reduced battery life.

In addition, these devices are being used more and more (both in frequency and length of time) to browse the Web, to read, draft and send e-mail messages, to download/upload/review documents etc. Again, this equates to increased power consumption further contributing to reduced battery life.

The illumination of the screens of these telephone systems produces ambient light. This may be unwanted in certain situations. For example, a user attending a meeting in a darkened conference room may be using one of these devices to download a document that is pertinent to a topic of the meeting. When doing so, the ambient light emitted by the screen of the device may be distracting to others in the room.

Likewise, a patron of an arts performance in a darkened theatre may use one of these devices to access the Web to retrieve background information on an artist, for example. Again, the ambient light emitted by the screen of the device in use may be disturbing/distracting to other patrons in the theatre.

Virtually every device with a screen provides a means for increasing/decreasing screen illumination. However, this is generally a manual process that under certain conditions may not be available (e.g., when the device is undergoing a "text search" the function may be temporarily made unavailable). The manual use of this function can be rather tedious.

For example, suppose a user would like the light output lowered when the device is performing a task (e.g., downloading a document from the Web) in a darkened room and back to its original intensity afterward for legibility. First, the user will have to access the Web and start the downloading process. Then, the user has to access the function on the telephone system to decrease the light output. After the document has been downloaded (a time that the user may not always be aware of or may not properly anticipate), the user has to re-access the function to increase the light output back to its original intensity. This requires a lot of time and attention of the user for a rather mundane task.

Another method that has been used is to use a light sensor to constantly sample current ambient light and to automatically adjust the brightness of the screen accordingly. This method is used by the Hewlett Packard™ IPAQ™ Pocket PC (Hewlett Packard is a trademark of Hewlett Packard, Corp and IPAQ is a trademark of Compact, Corp.). But, as in the case of the manual process above, a user may not know or properly anticipate when the device has terminated a task.

A further method that has been used is to use a magnetic strip to signal to the device that the screen is no longer needed to be illuminated. For example, Blackberry™ (a wireless data hand-held device marketed and sold by Canadian-based Research in Motion, LTD) uses a magnetic strip in its holster such that when placed therein, the device knows to automatically shut off its display. Again, a user may not know or properly anticipate when the device has terminated a task.

Note that when the user does not properly anticipate the time at which the device has finished a task, the user may continually check the device to ascertain so. The constant checking of the device may be a great source of annoyance to others.

Thus, what is needed is an apparatus, method and system of providing auto-dimming and state transition signal functionality to these telephone systems. The auto-dimming functionality helps increase battery life while minimizes the amount of distraction/disturbance to which others may be subjected when these devices are in use. The state transition signal lets a user know when the device has terminated a task.

SUMMARY OF THE INVENTION

The present invention provides an apparatus, system and method of providing auto-dimming and state transition signal functionality to a telephone system. Generally, when the telephone system is in use, it will have an illuminated screen that may distract others. Because of this, when the telephone system is entering a state that does not require monitoring by the user, the illuminated screen may dim down to decrease the likelihood of distraction by others. However, since the user may want to know when the telephone system is no longer in that state, the telephone system may alert the user when it has transitioned out of that state.

Accordingly, the telephone system will determine whether it is entering a predefined state. If so, the telephone system will automatically dim the illuminated screen. After doing so, the telephone system will determine when it has transitioned out of the predefined state. When that happens, the telephone system will send a signal to alert the user that it has transitioned out of the predefined state.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 depicts a table of "wait states" that may be defined by a user and/or a manufacturer.

DETAILED DESCRIPTION OF THE PREFERRED EMBODIMENT

The present invention will be explained using a cellular telephone. However, the invention is not thus restricted. As mentioned before, any hand-held device with a screen falls within the realm of the invention.

Figure 1:
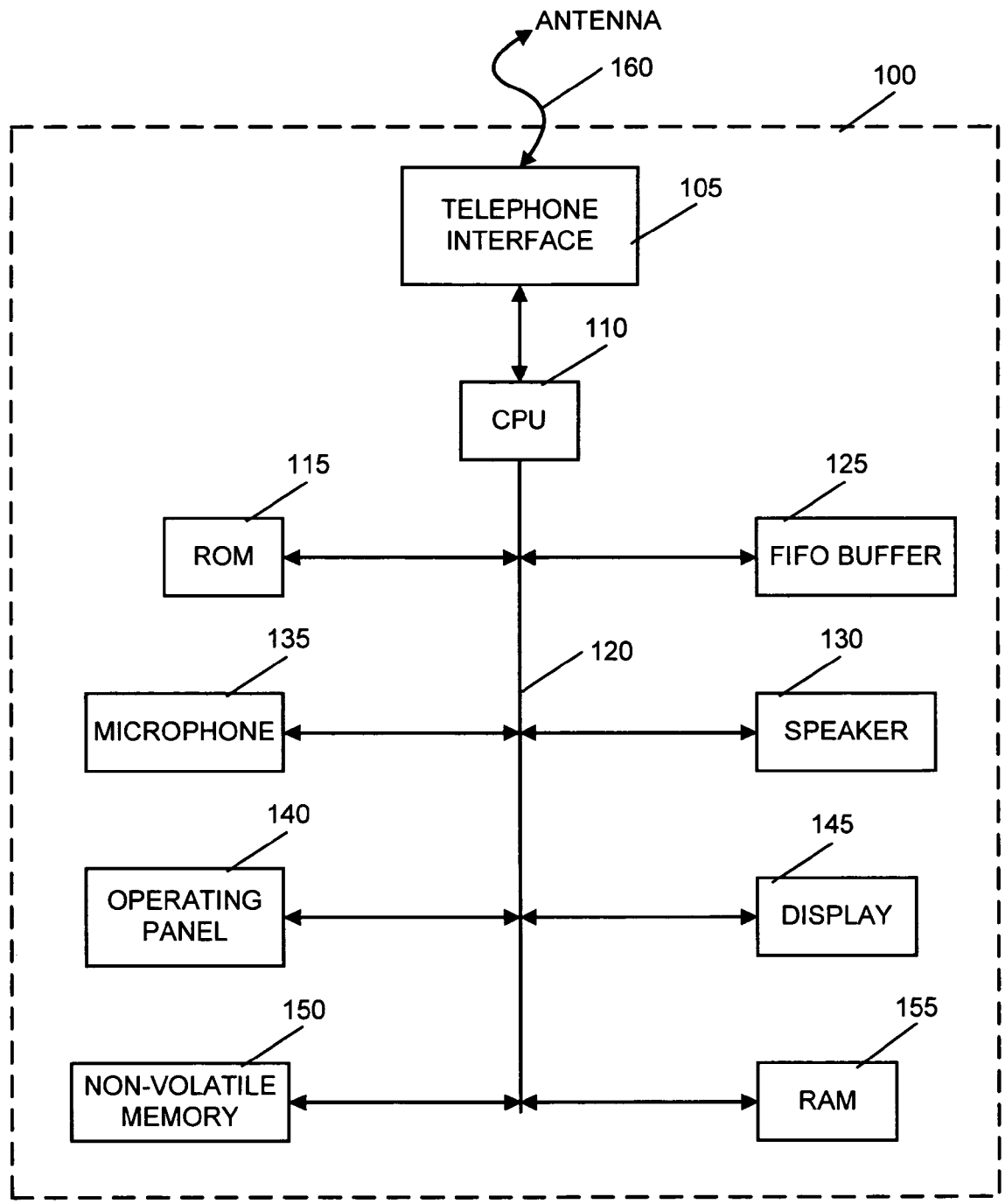
FIG. 1 depicts a schematic block diagram of a telephone apparatus.

Turning to the figures, FIG. 1 depicts a schematic block diagram of a telephone apparatus 100. The telephone apparatus 100 is connected to an antenna 160 through a telephone interface 105. The telephone interface 105 is connected to CPU 110. CPU 110 is connected to ROM 115, first-in, first-out (FIFO) buffer 125, speaker 130, microphone 135, operating panel 140, display 145, non-volatile memory 150 and RAM 155 via bus 120.

With the use of a software utility package stored in ROM 115, CPU 110 performs various functions. For example, the CPU 110 may send a ring tone to speaker 130 whenever the telephone interface 105 detects a ring signal. Likewise, CPU 110 may send a busy tone to speaker 130 when the telephone interface 105 detects a busy signal. Furthermore, when a dial tone is detected and if the CPU 110 detects that a speaker phone button (not shown) has been depressed, it may send the dial tone to speaker 130. Microphone 135 allows a user to communicate with a person and FIFO buffer 125 is used to store a most recently dialed number for redial, for example.

Non-volatile memory 150 may be used to store a phone book. In addition, non-volatile memory 150 may be used to store an operating system and application programs. The application programs, when executed by the CPU 110, may provide PDA functionality, Web browsing functionality, document downloading/uploading, e-mail services etc. as well as the functions of the present invention. These functions may be facilitated by display 145.

Figure 2:
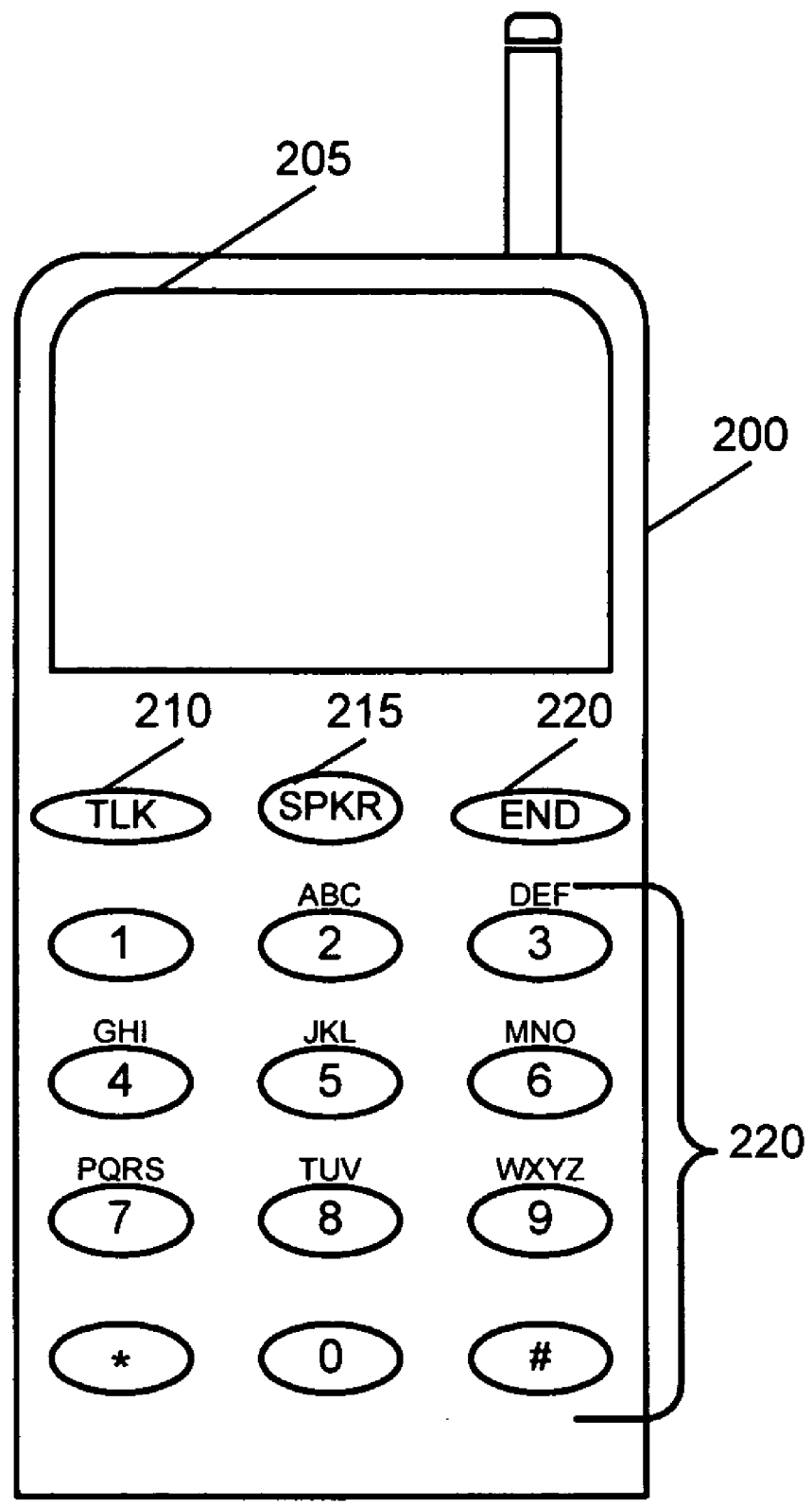
FIG. 2 depicts an operating panel of the telephone apparatus.

FIG. 2 depicts an operating panel 200. The operating panel 200 contains a screen 205, talk button 210, speaker button 315, end button 220 and alpha-numeric pad 225. The alpha-numeric pad is used to dial a number, to enter numbers and names of contacts in the telephone etc. The talk button 210 is used to establish a telephone connection with a person whose phone number has been dialed or a person who is calling the user. Speaker button 215 is to the speaker feature of the telephone (see speaker 130 of FIG. 1) and end button 220 to sever a telephone connection.

Display 205 may be a liquid crystal display (LCD) on which numbers that are being dialed are displayed. If the phone has an integrated caller identification (ID) feature, the caller ID information may also be displayed on the LCD 205. Further, downloaded documents, e-mail messages, PDA functionality etc. are all displayed on LCD 205. LCD display 205 is illuminated when the telephone is in use.

When a telephone number is displayed on the LCD 205 and talk button 210 is depressed, the displayed number will be dialed to complete the call. The method of speed dialing, redialing, entering numbers in phone books, retrieving numbers from phone books, using the speaker phone etc. is well known in the field and will not be described. Thus, the rest of this disclosure will focus on the present invention.

The invention is an apparatus, system and method of increasing battery life in a telephone system by decreasing screen light intensity when appropriate. Specifically, the invention provides for decreasing screen illumination during certain periods of time (e.g., during browser loading or other (optional) user-defined states) and lets a user know when the device changes states.

In a particular embodiment, the display may dim to the point of shutoff whenever a "wait state" is entered. A "wait state" may be defined by the device manufacturer and/or by a user. When the device changes from a defined "wait state" to another state, the device may use a signal to alert the user. The signal may be visual, audible or tactile. A visual signal may be a small indicator light that blinks or an increase in intensity of the illumination of the screen. An audible signal may be a buzzer, a vibration, a ring or any other audible noise whereas a tactile signal may be a vibration.

Note that the visual, audible and tactile signals described above are only used as examples. Any visual, audible and/or tactile clue that may be used to alert the user of the transition state of a device falls within the purview of the invention. Further, the visual, audible and/or tactile clue may be used alone or in different combinations with each other to alert a user of a transition state of a device.

FIG. 3 depicts a table of "wait states" that may be defined by a user and/or a manufacturer. The table has three columns: action column 302, active column 304 and indication column 306. In the action column 402 is displayed a plurality of defined "wait states". The "wait states" are "Web page loading" 310, "text search" 312, "system reset" 314, "document loading" 316 and "non-defined hourglass events" 318.

In the active column 304 it is indicated whether a "wait state" is activated such that when the device enters into that state the screen illumination will be automatically dimmed down. And, in the indication column 306, the indication that is to be given to a user when the device transitions out of a particular "wait state" is shown. These indications include "LED" 320, "vibration/LED" 322 and "screen illumination intensity increase" 324.

As an example, when the device is loading a Web page, the screen illumination of the device will be dimmed down since "Web page loading" 310 is set to "YES". When the Web page has been loaded or if for some reason the loading of the Web page has been discontinued, an LED light will flash to alert the user (that the page has been loaded or that Web page loading has been discontinued) since in the indication column 306 the indication is set to "LED" 320.

As another example, when the device is doing a "text search", the screen illumination of the device will be dimmed down since "text search" 312 is set to "YES". When the search is terminated, an LED light will flash while the device is vibrating to so alert the user since in the indication column 306 the indication is set to "vibration+LED" 322.

Note that document loading 316 and non-defined hourglass events 318 are set to "NO". Thus, when the device is loading a document, for example, the screen illumination of the device will not be dimmed down; nor will there be an alert sent to the user when the device has finished loading the document. By contrast, when the system (i.e., the device) is resetting, the screen illumination of the device will be dimmed down since "system reset" 314 is set to "YES". As soon as the system has finished resetting, the screen illumination of the device will be increased to so alert the user since in the indication column 306 the indication is set to "screen illumination intensity increase" 324.

Note also that while the user is setting up the table in FIG. 3, the user may be given an option to specify how low the screen should be dimmed down when the device is in any of the "wait states" identified above; or, whether it should be based on ambient light conditions.

Figure 4:
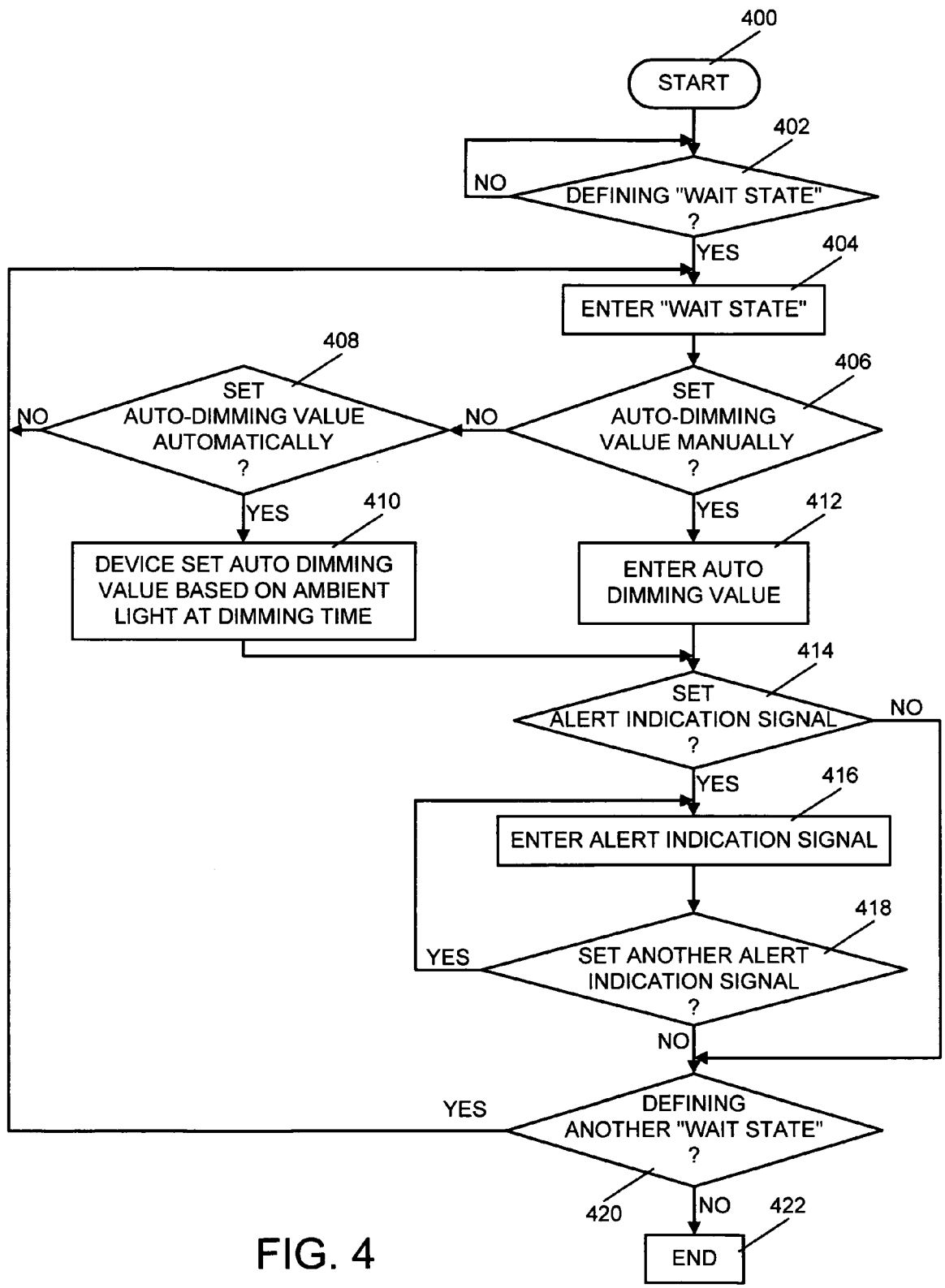
FIG. 4 depicts a flowchart of a first process that may be used to implement the invention.

FIG. 4 depicts a flowchart of a first process that may be used to implement the invention. The process starts when a user indicates that a "wait state" is to be defined by accessing a function on a device that allows for such feature (steps 400). Then, it is determined whether a "wait state" is to be defined through user confirmation (step 402). If a wait state is to be defined, the user will be prompted to enter the "wait state" in step 404. After the "wait state" has been entered, the user will be given an option to either enter an auto-dimming value (steps 406 and 412) or to let the device set the auto-dimming value based on ambient light at the time the auto-dimming feature is to take effect (steps 408 and 410). The auto-dimming value may be from one (1) to ten (10) where one (1) is the lowest and ten (10) is the highest.

Once the auto-dimming value has been entered, the user will be prompted to enter an alert indication signal (steps 414 and 416). The user may be prompted to enter as many different alert indication signals as the user wants by going through steps 418 and 416 repetitively. This facilitates the "vibration+LED" 322 entry in FIG. 3. After the user has entered one or all alert indication signals needed, the process will go to step 420 from step 418. The process will also go to step 420 from step 414 if the user indicates that no alert indication signal is needed.

At step 420, the user will be given a chance to define another "wait state". If the user wants to do so, the process will jump back to step 404. Otherwise, the process will end (step 422).

Figure 5:
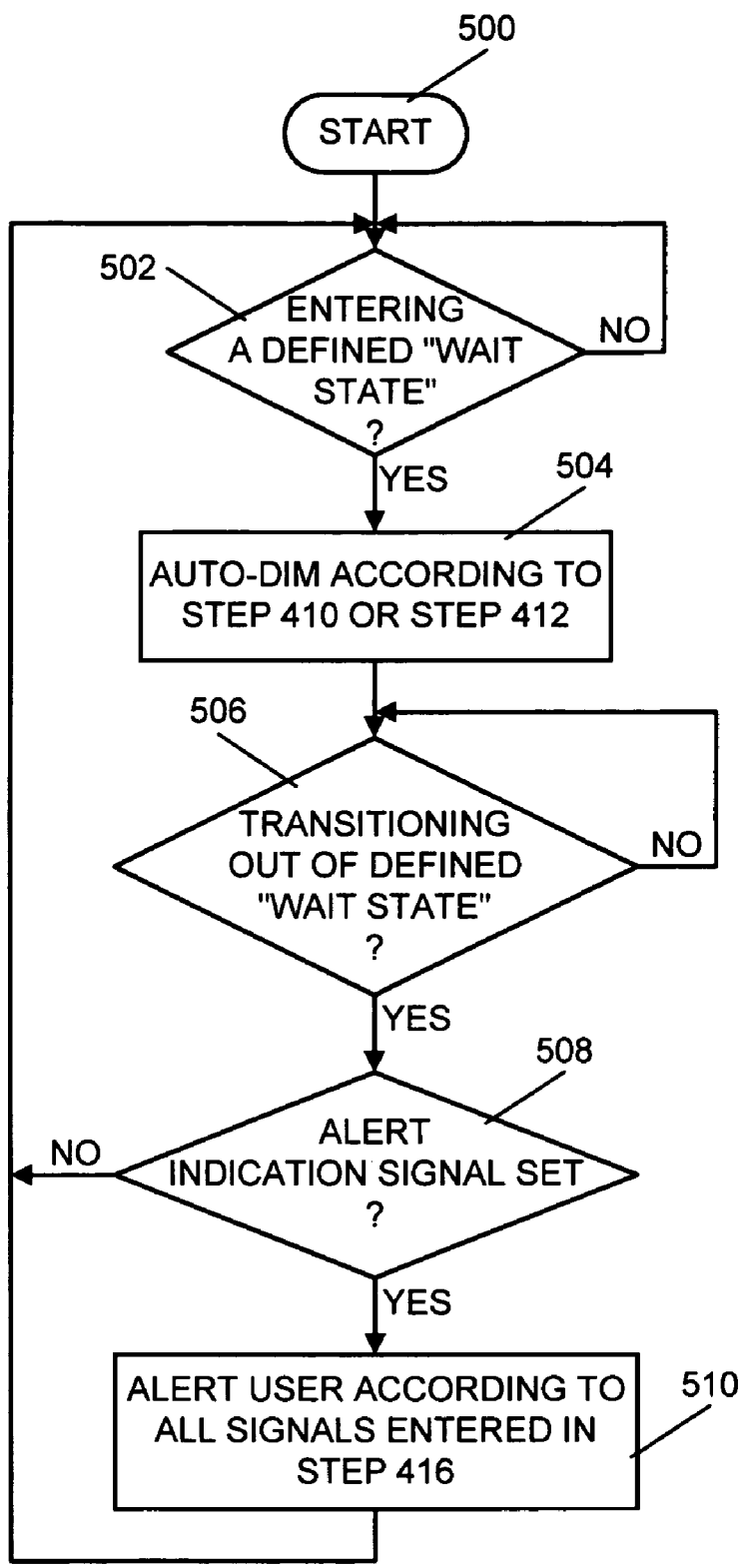
FIG. 5 depicts a flowchart of a second process that may be used to implement the invention.

FIG. 5 is a flowchart of a second process that may be used to implement the invention. This process starts when the device is turned on is reset (step 500). Then a check is continuously being made to determine whether the device is entering a defined "wait state" (step 502). If so, the screen illumination of the device will dim according to step 410 or step 412. A check will then continuously be made to determine whether the device is transitioning out of the defined "wait state" (step 506). If the device is transitioning out of the "wait state", it will be determined whether the user is to be alerted (step 508). If the user is not to be alerted, the process will jump back to step 502. If the user is to be alerted, then a signal or signals will be sent to the user in accordance with all the signals entered in step 416 before the process jumps back to step 502.

The description of the present invention has been presented for purposes of illustration and description, and is not intended to be exhaustive or limited to the invention in the form disclosed. Many modifications and variations will be apparent to those of ordinary skill in the art. For example, other user interfaces may be employed to carry out the invention. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of providing auto-dimming and state transition signal functionality to a telephone system, the telephone system having an illuminated screen, the method comprising:
    receiving specifications from a user of the telephone system, said specifications comprising:
        a specification of a first wait state selected from the group consisting of a web page being loaded, a text search being conducted, a system reset being performed, and combinations thereof,
        a specification that whenever the first wait state is entered into by the telephone system, the illuminated screen of the telephone system is to be dimmed,
        a specification of an alert indication signal that is to be sent to the user when the telephone system determines that the telephone system has transitioned out of the first wait state,
        a specification of a second wait state selected from the group consisting of a document loading, non-defined hourglass events, and combinations thereof,
        a specification that whenever the second wait state is entered into by the telephone system, the illuminated screen of the telephone system is not to be dimmed, and
        a specification that no alert indication signal is to be sent to the user when the telephone system determines that the telephone system has transitioned out of the second wait state;
    after said receiving specifications from the user, ascertaining that the telephone system has entered into the first wait state;
    dimming the illuminated screen of the telephone system in response to said ascertaining that the telephone system has entered into the first wait state;
    determining that the telephone system has transitioned out of the first wait state;
    sending the alert indication signal to the user in response to said determining that the telephone system has transitioned out of the first wait state;
    after said receiving specifications from the user, ascertaining that the telephone system has entered into the second wait state;
    not dimming the illuminated screen of the telephone system in response to said ascertaining that the telephone system has entered into the second wait state;
    determining that the telephone system has transitioned out of the second wait state;
    not sending the alert indication signal to the user in response to said determining that the telephone system has transitioned out of the second wait state.

2. The method of claim 1, wherein the first wait state consists of the web page being loaded.

3. The method of claim 1, wherein the first wait state consists of the text search being conducted.

4. The method of claim 1, wherein the first wait state consists of the system reset being performed.

5. The method of claim 1, wherein said dimming comprises:
    dimming the illuminated screen to a previously specified value.

6. The method of claim 1, wherein said dimming comprises:
    sampling current ambient light; and
    dimming the illuminated screen of the telephone system based on the sampled ambient light.

7. The method of claim 1,
    wherein the method further comprises generating a table consisting of three columns and a plurality of rows,
    wherein the three columns consist of an action column, an active column, and an indication column;
    wherein the action column identifies a wait state in each row,
    wherein the active column indicates whether or not said dimming will be performed when the telephone system enters the wait state identified in the action column,
    wherein the indication column identifies the alert indication signal to be sent to the user if the telephone system determines that the telephone system has transitioned out of the wait state identified in the action column, and
    wherein the action column in a first row of the plurality of rows identifies the first wait state of the web page being loaded,
    wherein the action column in a second row of the plurality of rows identifies the first wait state of the text search being conducted,
    wherein the action column in a third row of the plurality of rows identifies the first wait state of the system reset being performed,
    wherein the action column in a fourth row of the plurality of rows identifies the second wait state of the document loading, wherein the action column in a fifth row of the plurality of rows identifies the second wait state of the non-defined hourglass events.

8. The method of claim 1, wherein the telephone system comprises a cellular phone, and wherein the first and second wait state of the telephone system consists of a first and second wait state of the cellular phone, respectively.

9. The method of claim 1, wherein the alert indication signal specified by the user is:
   a flashing LED light if the first wait state is said web page being loaded,
   a vibration combined with said flashing LED light if the first wait state is said text search being conducted, and
   an illumination increase of the illuminated screen of the telephone system if the first wait state is said system reset being performed.

10. A telephone system having an illuminated screen, the telephone system being able to auto-dim the illuminated screen and to alert a user of a transition from one predefined wait state to another state, the telephone system comprising:
   at least one storage device for storing program code; and
   at least one processor for executing the program code to perform a method, the method comprising:
      receiving specifications from a user of the telephone system, said specifications comprising:
         a specification of a first wait state selected from the group consisting of a web page being loaded, a text search being conducted, a system reset being performed, and combinations thereof,
         a specification that whenever the first wait state is entered into by the telephone system, the illuminated screen of the telephone system is to be dimmed,
         a specification of an alert indication signal that is to be sent to the user when the telephone system determines that the telephone system has transitioned out of the first wait state,
         a specification of a second wait state selected from the group consisting of a document loading, non-defined hourglass events, and combinations thereof,
         a specification that whenever the second wait state is entered into by the telephone system, the illuminated screen of the telephone system is not to be dimmed, and
         a specification that no alert indication signal is to be sent to the user when the telephone system determines that the telephone system has transitioned out of the second wait state;
      after said receiving specifications from the user, ascertaining that the telephone system has entered into the first wait state;
      dimming the illuminated screen of the telephone system in response to said ascertaining that the telephone system has entered into the first wait state;
      determining that the telephone system has transitioned out of the first wait state;
      sending the alert indication signal to the user in response to said determining that the telephone system has transitioned out of the first wait state;
      after said receiving specifications from the user, ascertaining that the telephone system has entered into the second wait state;
      not dimming the illuminated screen of the telephone system in response to said ascertaining that the telephone system has entered into the second wait state;
      determining that the telephone system has transitioned out of the second wait state;
      not sending the alert indication signal to the user in response to said determining that the telephone system has transitioned out of the second wait state.

11. The telephone system of claim 10, wherein the first wait state consists of the web page being loaded.

12. The telephone system of claim 10, wherein the first wait state consists of the text search being conducted.

13. The telephone system of claim 10, wherein the first wait state consists of the system reset being performed.

14. The telephone system of claim 10, wherein said dimming comprises:
   dimming the illuminated screen to a previously specified value.

15. The telephone system of claim 10, wherein said dimming comprises:
   sampling current ambient light; and
   dimming the illuminated screen of the telephone system based on the sampled ambient light.

16. The telephone system of claim 10,
   wherein the method further comprises generating a table consisting of three columns and a plurality of rows,
   wherein the three columns consist of an action column, an active column, and an indication column;
   wherein the action column identifies a wait state in each row,
   wherein the active column indicates whether or not said dimming will be performed when the telephone system enters the wait state identified in the action column,
   wherein the indication column identifies the alert indication signal to be sent to the user if the telephone system determines that the telephone system has transitioned out of the wait state identified in the action column, and
   wherein the action column in a first row of the plurality of rows identifies the first wait state of the web page being loaded,
   wherein the action column in a second row of the plurality of rows identifies the first wait state of the text search being conducted,
   wherein the action column in a third row of the plurality of rows identifies the first wait state of the system reset being performed,
   wherein the action column in a fourth row of the plurality of rows identifies the second wait state of the document loading,
   wherein the action column in a fifth row of the plurality of rows identifies the second wait state of the non-defined hourglass events.

17. The telephone system of claim 10, wherein the telephone system comprises a cellular phone, and wherein the first and second wait state of the telephone system consists of a first and second wait state of the cellular phone, respectively.

18. The telephone system of claim 10, wherein the alert indication signal specified by the user is:
   a flashing LED light if the first wait state is said web page being loaded,
   a vibration combined with said flashing LED light if the first wait state is said text search being conducted, and
   an illumination increase of the illuminated screen of the telephone system if the first wait state is said system reset being performed.

* * * * *